United States Patent
Hasegawa et al.

(10) Patent No.: US 7,401,357 B2
(45) Date of Patent: Jul. 15, 2008

(54) AUTHENTICATION SYSTEM, MOBILE TERMINAL, AND AUTHENTICATION METHOD

(75) Inventors: Tooru Hasegawa, Yokosuka (JP); Toyota Nishi, Yokosuka (JP); Akira Kaiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 848 days.

(21) Appl. No.: 10/301,671

(22) Filed: Nov. 22, 2002

(65) Prior Publication Data

US 2003/0120916 A1    Jun. 26, 2003

(30) Foreign Application Priority Data

Nov. 22, 2001   (JP) ............................. 2001-357875

(51) Int. Cl.
*G06F 7/04* (2006.01)
(52) U.S. Cl. ....................................................... 726/21
(58) Field of Classification Search ................. 726/21
See application file for complete search history.

(56) References Cited

U.S. PATENT DOCUMENTS

| | | | |
|---|---|---|---|
| 5,550,928 A * | 8/1996 | Lu et al. ..................... | 382/116 |
| 6,141,436 A | 10/2000 | Srey et al. | |
| 6,508,709 B1 * | 1/2003 | Karmarkar ................... | 463/42 |

FOREIGN PATENT DOCUMENTS

| | | |
|---|---|---|
| EP | 0 808 048 | 11/1997 |
| EP | 1 011 285 | 6/2000 |
| GB | 2 362 249 A | 11/2001 |
| JP | 2001-169228 | 6/2001 |
| JP | 2001-273498 | 10/2001 |
| WO | WO 98/11750 | 3/1998 |
| WO | WO 01/19119 | 3/2001 |
| WO | WO 01/84770 | 11/2001 |
| WO | WO 01/86599 A2 | 11/2001 |

OTHER PUBLICATIONS

Osamu Yamaguchi, Kazuhiro Fukui, Ken-ichi Maeda, "Face Recognition System using Temporal Image Sequence", Technical Report of IEICE; "Pattern recognition and Media comprehension" PRMU97-50, Jun. 20, 1997, vol. 97, No. 113, p. 17-24.

* cited by examiner

*Primary Examiner*—Kambiz Zand
*Assistant Examiner*—Jacob Lipman
(74) *Attorney, Agent, or Firm*—Oblon, Spivak, McClelland, Maier & Neustadt, P.C.

(57) ABSTRACT

An authentication system comprises a register image storage unit, which stores a pre-registered register image of a mobile terminal user; a communication control unit, which receives a moving image of the user transmitted from the mobile terminal; and an authentication processing unit, which authenticates the user by checking the moving image received by the communication control unit against the register image stored in the register image storage unit.

19 Claims, 4 Drawing Sheets

AUTHENTICATION SYSTEM, MOBILE TERMINAL, AND AUTHENTICATION METHOD

CROSS REFERENCE TO RELATED APPLICATIONS

This application is based upon and claims the benefit of priority from the prior Japanese Patent Applications No. P2001-357875, filed on Nov. 22, 2001; the entire contents of which are incorporated herein by reference.

BACKGROUND OF THE INVENTION

1. Field of the Invention

The present invention relates to an authentication system, a mobile terminal, and an authentication method.

2. Description of the Related Art

Conventionally, there is an authentication system that authenticates a mobile terminal user by checking a password configured with numerals or characters that are pre-registered in the authentication system against a password transmitted from the mobile terminal to the authentication system.

In addition, there is an authentication system that authenticates using an image photographed by a camera that is provided for photographing an authentication subject at each location where authentication is performed.

However, with the conventional authentication system using a password, there is a concern that a mobile terminal or password may be abused if a third party steals the mobile terminal or password. Accordingly, the conventional authentication system is considered to have a low level of security.

In addition, with the conventional authentication system where a camera is provided at each location where authentication is performed, authentication may be performed only at the specific location where a camera is provided.

Therefore, an authentication system that has a high level of security, and can authenticate using an image irrespective of the location of the authentication subject, is desired.

BRIEF SUMMARY OF THE INVENTION

An object of the present invention is to provide an authentication system that has a high level of security, and can authenticate using an image irrespective of the location.

An authentication system according to an aspect of the present invention comprises a register image storage unit, which stores a pre-registered register image of a mobile terminal user; a communication control unit, which receives a moving image of the user transmitted from the mobile terminal; and an authentication processing unit, which authenticates the user by checking the moving image received by the communication control unit against the register image stored in the register image storage unit.

Such an authentication system, the register image storage unit stores the pre-registered register image of the mobile terminal user. In addition, the communication control unit receives a moving image of the user transmitted from the mobile terminal. Then the authentication processing unit authenticates the user by checking the moving image received by the communication control unit against the register image stored in the register image storage unit.

As a result, the authentication system can determine correctly whether or not the user is him/herself by using the moving image of the user transmitted from the mobile terminal. Accordingly, the authentication system has a very high level of security, and may prevent the mobile terminal from being abused by a third party. Furthermore, the communication control unit receives a moving image transmitted from the mobile terminal. As a result, the authentication system may authenticate using the image irrespective of the location of the authentication subject.

DETAILED DESCRIPTION OF THE INVENTION

Figure 1:
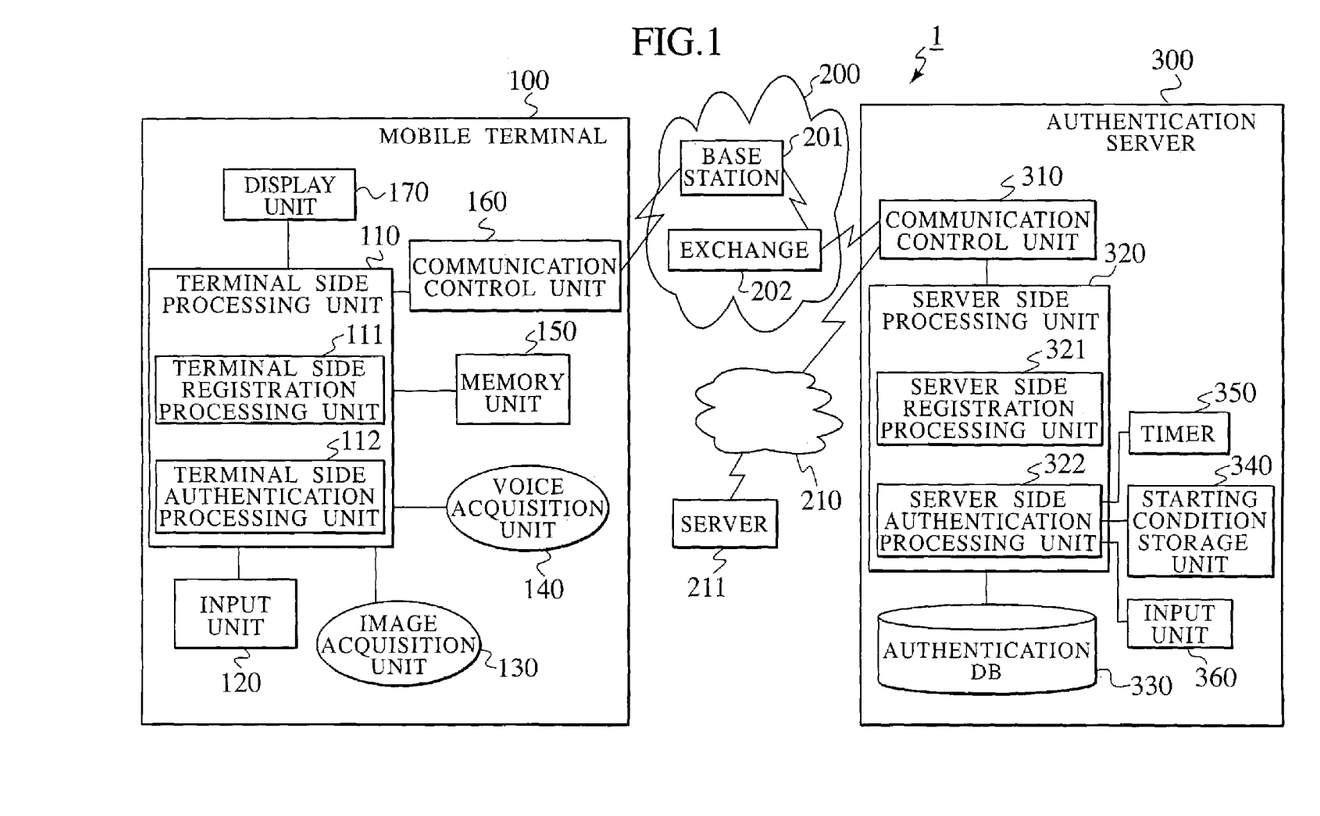
FIG. 1 is a block diagram illustrating the configuration of an authentication system according to an embodiment of the present invention.

An embodiment of the present invention is described with reference to the drawings. As shown in FIG. 1, an authentication system 1 comprises a mobile terminal 100, a mobile communication network 200, an authentication server 300, a network 210, and a server 211.

The mobile terminal 100 communicates with the authentication server 300 or the server 211 via the mobile communication network 200. As shown in FIG. 1, the mobile terminal 100 comprises a terminal side processing unit 110, an input unit 120, an image acquisition unit 130, a voice acquisition unit 140, a memory unit 150, a communication control unit 160, and a display unit 170. The terminal side processing unit 110 comprises a terminal side registration processing unit 111 and a terminal side authentication processing unit 112. The mobile terminal 100 may be, for example, a personal handy phone system (PHS), personal digital assistant (PDA), or laptop personal computer.

The image acquisition unit 130 is a moving image acquisition unit that acquires a moving image of the mobile terminal 100 user. The image acquisition unit 130 also functions as a register image acquisition unit that acquires a register image of the user for registration in the authentication server 300.

The image acquisition unit 130 acquires the moving image of the user during authentication by the authentication server 300. The image acquisition unit 130 also acquires a static image or moving image of the user as a register image at the time of registration of the register image in the authentication server 300. The image acquisition unit 130 acquires a moving image or static image capable of authenticating the user. For example, the image acquisition unit 130 acquires a moving image or static image of the user's face.

During authentication, the image acquisition unit 130 continues to acquire real-time moving images of the user, while the mobile terminal 100 and the authentication server 300 are connected. Then the image acquisition unit 130 continues to input the acquired real-time moving images to the terminal side authentication processing unit 112. In addition, the image acquisition unit 130 inputs the acquired static image or moving image of the user to the terminal side registration processing unit 111 at the time of registration of the register image. For example, a digital camera employing a charge coupled device (CCD) may be used as the image acquisition unit 130.

The terminal side processing unit 110 performs various types of processing in the mobile terminal 100. To begin with, the terminal side authentication processing unit 112 performs processing relating to authentication by the authentication server 300. More specifically, the terminal side authentication processing unit 112 converts a moving image, which is inputted from the image acquisition unit 130, into a signal that the communication control unit 160 can transmit through the mobile communication network 200. The terminal side authentication processing unit 112 inputs the signal converted from the moving image to the communication control unit 160. During authentication, the real-time moving image of the user is inputted to the terminal side authentication processing unit 112 by the image acquisition unit 130, while the mobile terminal 100 and the, authentication server 300 are connected. Accordingly, the terminal side authentication processing unit 112 continues to convert and input the moving images to the communication control unit 160, while the mobile terminal 100 and the authentication server 300 are connected.

At this time, the terminal side authentication processing unit 112 acquires identification data for the user from the memory unit 150. Then the terminal side authentication processing unit 112 inputs the identification data, in addition to the signal converted from the moving image, to the communication control unit 160. The identification data may be any data that identifies the user. The identification data may be, for example, the telephone number of the mobile terminal 100, or a user ID configured with characters or numerals.

The terminal side registration processing unit 111 performs processing relating to the registration of the register image in the authentication server 300. More specifically, the terminal side registration processing unit 111 converts the static image or moving image, which is the register image inputted from-the image acquisition unit 130, into a signal that the communication control unit 160 can transmit through the mobile communication network 200. The terminal side registration processing unit 111 inputs the signal converted from the register image to the communication control unit 160. The terminal side registration processing unit 111 acquires the static image or moving image acquired from the image acquisition unit 130 in accordance with the user's operation input through the input unit 120.

At this time, the terminal side registration processing unit 111 acquires the identification data of the user from the memory unit 150. Then, the terminal side registration processing unit 111 inputs the identification data in addition to the converted register image to the communication control unit 160. In addition, the terminal side registration processing unit 111 stores the register image inputted from the image acquisition unit 130 in the memory unit 150. Then the terminal side registration processing unit 111 acquires the register image from the memory unit 150, converts the image into a signal, and inputs the signal to the communication control unit 160 if necessary, such as in the case of retransmitting the register image.

The terminal side registration processing unit 111 and terminal side authentication processing unit 112 operate independently. Therefore, the terminal side registration processing unit 111 and terminal side authentication processing unit 112 may be provided in different mobile terminals. The mobile terminal 100 includes at least the terminal side authentication processing unit 112. Accordingly, the terminal side registration processing unit 111 may be provided in any computer system other than the mobile terminal 100.

Moreover, the terminal side processing unit 110 performs processing in accordance with the user's operation input through the input unit 120. The terminal side processing unit 110 converts voice. which is inputted from the voice acquisition unit 140, into a signal that the communication control unit 160 can transmit through the mobile communication network 200. The terminal side processing unit 110 inputs the signal converted from the voice to the communication control unit 160. The terminal side processing unit 110 stores the voice acquired from the voice acquisition unit 140 in the memory unit 150, if required.

The terminal side processing unit 110 outputs the moving image or static image inputted from the image acquisition unit 130 to the display unit 170. The terminal side processing unit 110 outputs a notification from the authentication server 300 or the server 211, which is inputted from the communication control unit 160, to the display unit 170. The terminal side processing unit 110 outputs instructions for the user, i.e. requesting input of data or confirmation of data, to the display unit 170.

The communication control unit 160 communicates with the authentication server 300 or the server 211 via the mobile communication network 200. The communication control unit 160 connects to the authentication server 300 for communication.

The communication control unit 160 transmits the moving image acquired by the image acquisition unit 130 to the authentication server 300. More specifically, the communication control unit 160 transmits the signal that is converted by the terminal side authentication processing unit 112 from the moving image acquired by the image acquisition unit 130. During authentication, real-time moving images, are inputted the communication control unit 160 by the terminal side authentication processing unit 112, while the mobile terminal 100 and the authentication server 300 are connected. Accordingly, the communication control unit 160 continues to transmit the real-time moving image signals, while the mobile terminal 100 and the authentication server 300 are connected. At this time, identification data together with the moving image signal are inputted to the communication control unit 160 by the terminal side authentication processing unit 112. Therefore, transmits the identification data in addition to the moving image signal.

Thus, it is possible for the mobile terminal 100 to transmit the moving image in real time as a result of the combination of the image acquisition unit 130, the terminal side authentication processing unit 112, and the communication control unit 160. In other words, the mobile terminal 100 has the capacity to function as a "video-phone". In addition, with a mobile terminal such as the mobile terminal 100, the image acquisition unit 130 acquires the moving image of the user. Then the communication control unit 160 transmits the moving image acquired by the image acquisition unit 130 to the authentication server 300, while the mobile terminal 100 and the authentication server 300 are connected. Therefore, the mobile terminal 100 may receive authentication from the authentication server 300 that performs the authentication using the moving image of the user transmitted from the mobile terminal 100. Accordingly, the mobile terminal 100 user may prevent its abuse by a third party. The mobile terminal 100 user may receive authentication using the image irrespective of the user's location.

The communication control unit 160 transmits the register image acquired by the image acquisition unit 130 to the authentication server 300. More specifically, the communication control unit 160 transmits the signal that has been converted by the terminal side registration processing unit 111 from the register image acquired by the image acquisition unit 130. At this time, identification data together with the signal of the register image are inputted to the communication control unit 160 by the terminal side registration processing unit 111. Accordingly, the communication control unit 160 transmits the identification data together with the register image signal. In this manner, by registering the identification data together with the register image in the authentication server 300, makes it is difficult for a third party to use the mobile terminal 100 illegally.

In addition, the communication control unit 160 transmits the voice acquired by the voice acquisition unit 140 to the authentication server 300 and the server 211. More specifically, the communication control unit 160 transmits a signal that is converted by the terminal side processing unit 110, from the voice acquired by the voice acquisition unit 140. In addition, the communication control unit 160 receives notification transmitted from the authentication server 300 or the server 211. The communication control unit 160 inputs a notification of receipt to the terminal side processing unit 110.

The input unit 120 accepts the input from the user of the mobile terminal 100. The input unit 120 is capable of accepting input by the user. For example, the input unit 120 may be a plurality of buttons or keys. The input unit 120 inputs the contents inputted through the user operation to the terminal side processing unit 110. For example, the user selects the register image from the images acquired by the image acquisition unit 130, and inputs it to the input unit 120. Then the input unit 120 inputs the contents inputted through the user operation to the terminal side registration processing unit 111.

The voice acquisition unit 140 acquires the voice of the user. The voice acquisition unit 140 inputs the acquired voice to the terminal side processing unit 110. The voice acquisition unit 140 may be, for example, a microphone. The voice acquisition unit 140 is not always necessary since the mobile terminal 100 receives the authentication using the image, from the authentication server 300. In the case that the mobile terminal 100 is a cellular phone, a voice output unit is provided that outputs the voice received by the communication control unit 160. In this case, the voice inputted from the communication control unit 160 is outputted to the voice output unit by the terminal side processing unit 110. Alternatively, the user may input the operation contents to the voice acquisition unit 140 by voice, instead of the input unit 120. In this case, the voice acquisition unit 140 feeds the operation contents input from the user into the terminal side processing unit 110.

The memory unit 150 stores various types of information. For example, the memory unit 150 stores the register image acquired by the image acquisition unit 130, voice acquired by the voice acquisition unit 140, and the identification data of the user. The memory unit 150 may be, for example, memory. In addition, the memory unit 150 stores the register image and voice as digital data.

The display unit 170 displays various types of information. For example, the display unit 170 displays the image acquired by the image acquisition unit 130, the notification received by the communication control unit 160 from the authentication server 300 or the server 211, and instructions for the user from the terminal processing unit 110. The display unit 170 may be, for example, a thin film transistor liquid crystal display unit.

The mobile communication network 200 provides a communication path for communication between the mobile terminal 100 and the authentication server 300, the server 211, and a terminal. As shown in FIG. 1, the mobile communication network 200 includes a base station 201 and an exchange 202. The base station 201 communicates with the mobile terminal 100 via a radio wave. The base station 201 and exchanger 202 are connected via a signal line. The exchange 202 connects to, and communicates with the authentication server 300 via the signal line. It should be noted that the exchange 202 may also be connected to the authentication server 300 via other networks.

The mobile communication network 200 is a network that can transmit the moving image transmitted from the mobile terminal 100 to the authentication server 300. In other words, the mobile communication network 200 is a network capable of using a "video-phone". More specifically, the mobile communication network 200 transmits the moving image in real time. In other words, the mobile communication network 200 transmits the moving image within an acceptable delay time. The mobile communication network 200 has a transmission speed that accomplishes transmission of the moving image within an acceptable delay time. The mobile communication network 200 may be, for example, a circuit switching type network or a packet switching type network. However, it is preferable that the mobile communication network 200 be the circuit switching type network.

The server 211 is a server that provides various services to the user of the mobile terminal 100. The server 211 connects to the authentication server 300 via the network 210. The network 210 provides a communication path for communication between the server 211 and the authentication server 300. The server 211 provides services to the mobile terminal 100 via the authentication server 300. In other words, only the user of the mobile terminal 100 who is identified as being him/herself by the authentication server 300 can use services provided by the server 211 on the mobile terminal 100. For example, the server 211 provides services for selling goods through on-line shopping. The server 211 also provides services relating to home security or building security that determines whether or not a person is allowed to enter his/her house or a building, and locks/unlocks the house or building.

The server 211 requests the authentication of the mobile terminal 100 user to the authentication server 300. For example, in the case that the server 211 provides services for selling goods, the server 211 requests authentication when the user purchases goods. In the case that the server 211 provides services relating to home security or building security, the server 211 requests authentication when the user wishes to enter their house or a building. In other words, the server 211 makes a request for the authentication of the user to the authentication server 300 when authentication is required in accordance with the user's action.

The authentication server 300 is an authentication system that authenticates the user of the mobile terminal 100. The authentication server 300 determines whether or not the user of the mobile terminal 100 is him/herself. The authentication server 300 communicates with the mobile terminal 100 via the mobile communication network 200. The authentication server 300 also communicates with the server 211 via the network 210. As shown in FIG. 1, the authentication server 300 comprises a communication control unit 310, a server side processing unit 320, an authentication database (hereinafter, referred to as "authentication DB") 330, a starting condition storage unit 340, a timer 350, and an input unit 360. The server side processing unit 320 comprises a server side registration processing unit 321 and a server side authentication processing unit 322.

The authentication DB 330 is a register image storage unit that stores the register image of the mobile terminal 100 user that has been pre-registered. The authentication DB 330 connects the identification data with the register image and stores them both. Thus, the identification data of the user may be used as the key for the authentication DB 330. The authentication DB 330 stores the identification data of the user and the register image transmitted from the mobile terminal 100. The authentication DB 330 stores the identification data and the register image of the user inputted from the server side registration processing unit 321. The authentication DB 330 may store other information to be used for authentication processing.

The communication control unit 310 communicates with the mobile terminal 100 via the mobile communication network 200. The communication control unit 310 connects to the mobile terminal 100 to perform information transmission/reception. The communication control unit 310 receives the moving image of the user transmitted from the mobile terminal 100 via the mobile communication network 200. More specifically, during authentication, the communication control unit 310 continues to receive real-time moving image signals transmitted from the mobile terminal 100, while the authentication server 300 and the mobile terminal 100 are connected. At this time, the communication control unit 310 receives the identification data of the user in addition to the moving image signal. The communication control unit 310 inputs the received moving image and identification data of the user to the server side authentication processing unit 322.

The communication control unit 310 receives the register image of the user transmitted from the mobile terminal 100 via the mobile communication network 200. More specifically, the communication control unit 310 receives the register image signals transmitted from the mobile terminal 100 when the authentication server registers the register image. At this time, the communication control unit 310 receives the identification data of the user in addition to the register image signal. The communication control unit 310 inputs the received register image and identification data of the user to the server side registration processing unit 321. The communication control unit 310 also transmits the notification for the mobile terminal 100 to the mobile terminal 100. The notification for the mobile terminal 100 is inputted to the communication control unit 310 by the server side processing unit 320. The communication control unit 310 disconnects the connection with the mobile terminal 100 in accordance with instructions from the server side authentication processing unit 322.

The communication control unit 310 communicates with the server 211 via the mobile communication network 210. The communication control unit receives the authentication request of the mobile terminal 100 user from the server 211. The communication control unit 310 inputs the received authentication request to the server side authentication processing unit 322. The communication control unit 310 transmits a notification to the server 211. The notification for the server 211 is inputted to the communication control unit 310 by the server side authentication processing unit 322.

The server side processing unit 320 performs various types of processing in the authentication server 300. To begin with, the server side authentication processing unit 322 performs processing relating to the authentication of the user of the mobile terminal 100. The server side authentication processing unit 322 is an authentication processing unit that authenticates the user by checking the moving image received by the communication control unit 310 against the register image stored in the authentication DB 330. The server side authentication processing unit 322 is inputted the moving image signal and identification data of the user by the communication control unit 310. During authentication, the real-time moving image is inputted to the server side authentication processing unit 322 by the communication control unit 310, while the authentication server 300 and the mobile terminal 100 are connected.

The server side authentication processing unit 322 converts the moving image signals inputted from the communication control unit 310 into moving images. In addition, the server side authentication processing unit 322 searches the authentication DB 330 for the identification data inputted from the communication control unit 310. The server side authentication processing unit 322 acquires the identification data and the register image associated with the identification data from the authentication DB 330. The server side authentication processing unit 322 checks the register image acquired from the authentication DB 330 against the converted moving image. The server side authentication processing unit 322 also checks the identification data received by the communication control unit 310 against the identification date acquired from the authentication DB 330. If the moving image matches the register image, and the received identification data matches the stored identification data in the authentication DB 330, then the server side authentication processing unit 322 determines that the user of the mobile terminal 100 is the user him/herself. If either the image or the identification data does not match, then the server side authentication processing unit 322 determines that the user is not the user him/herself. In this manner, accordingly, by not only checking the moving image against the register image, but also checking the identification data, it is possible to perform more accurate authentication with the server side authentication processing unit 322, and security levels may be enhanced, The server side authentication processing unit 322 acquires, for example, a static image from the moving image at a certain timing. Then the server side authentication processing unit 322 checks the static image acquired from the moving image against the register image. If the moving image transmitted from the mobile terminal 100 is stored without change as the register image in the authentication DB 330, then the server side authentication processing unit 322 acquires a static image from the register image of the moving image. Then the server side authentication processing unit 322 checks the moving images to be authenticated against the static image acquired from the moving image of the register image.

In addition, the server side authentication processing unit 322 may check the moving image to be authenticated against the moving image of the register image. In addition, when the moving image or register image is the image of the user's face, the server side authentication processing unit 322 performs shape recognition on the individual parts of the face from the image. The server side authentication processing unit 322 checks the images by determining whether the recognized shapes of the parts match or not. It is also preferable that the server side authentication processing unit 322 acquire a plurality of static images from the moving image. Next, the server side authentication processing unit 322 checks the acquired plurality of static images against the register images, respectively. Through this, the accuracy of checks performed at the server side authentication processing unit 322 may be enhanced. Accordingly, the server side authentication processing unit 322 may perform a more accurate authentication. In addition, the server side authentication processing unit 322 may acquire a pre-defined fixed number of static images from the moving image to check against the register image. If the percentage of matches between the acquired plurality of static images and the register images is higher than a threshold value, the server side authentication processing unit 322 determines that the user has been identified as him/herself, and if the percentage is below the threshold value, it determines that the user has not been identified as him/herself.

To begin with, the server side authentication processing unit 322 authenticates when the mobile terminal 100 connects to the authentication server 300. At this point, the server side authentication processing unit 322 authenticates using the moving image when the mobile terminal 100 connects to the communication control unit 310 and begins transmission of the moving image.

The server side authentication processing unit 322 also authenticates based on the starting conditions stored in the starting condition storage unit 340. The starting condition storage unit 340 stores the starting conditions for starting authentication. The starting conditions for starting authentication are pre-registered in the starting condition storage unit 340. The server side authentication processing unit 322 acquires the starting conditions from the starting condition storage unit 340, and authenticates based on the acquired starting conditions.

For example, the starting condition storage unit 340 stores a cycle for starting authentication as the starting condition. The cycle may be a fixed cycle or random cycle. In this case, the server side authentication processing unit 322 acquires the cycle as the starting condition from the starting condition storage unit 340. The server side authentication processing unit 322 also acquires the time from the timer 350. The server side authentication processing unit 322 measures the cycle for starting authentication by using the time acquired from the timer 350. The server side authentication processing unit 322 starts the authentication when the time reaches the cycle of the starting conditions. The timer 350 supplies the time to the server side authentication processing unit 322.

The starting condition storage unit 340 also stores an event as the starting condition for starting the authentication. In this case, the server side authentication processing unit 322 acquires the event for starting the authentication as the starting condition from the starting condition storage unit 340. Then the server side authentication processing unit 322 starts authentication when the event occurs. For example, the starting condition storage unit 340 stores the starting conditions that the authentication is performed again, if the checked results of the moving image against the register image and the identification data do not identify the user as him/herself. In this case, if the checked results do not identity the user as him/herself, then the server side authentication processing unit 322 starts re-authentication. The server side authentication processing unit 322 performs re-authentication by using the moving image that is received by the communication control unit 310 at the re-authentication. The starting condition storage unit 340 may store the user's operation as the event for starting authentication.

The server side authentication processing unit 322 accepts the authentication request, and authenticates based on the request. For example, the server side authentication processing unit 322 accepts the request for authentication from the server 211. The server side authentication processing unit 322 starts the authentication when the communication control unit 310 inputs the authentication request from the server 211 that is received by the communication control unit 310.

The server side authentication processing unit 322 also accepts the request for the authentication from the input unit 360. The input unit 360 accepts input from the operator of the authentication server 300. The input unit 360 may be able to accept operator's input. The input unit 360 may be, for example, a plurality of buttons, keys, and microphones. The input unit 360 inputs the input contents inputted through the operator's operations to the server side authentication processing unit 322. For example, the operator inputs the request for authentication to the input unit 360 if required or when receiving a request from a third party.

If the user is identified as him/herself, then the server side authentication processing unit 322 remains connected to the mobile terminal 100. On the other hand, if the user is not identified as him/herself, then the server side authentication processing unit 322 instructs the communication control unit 310 to disconnect from the mobile terminal 100. At this time, the authentication server 300 may transmit a notification based on the authentication result to the mobile terminal 100. In such a case, the server side authentication processing unit 322 creates the notification based on the authentication result and inputs the notification to the communication control unit 310. For example, if the user is identified as him/herself, then the server side authentication processing unit 322 creates an authentication complete notification. If the user is not identified as him/herself, then the server side authentication processing unit 322 creates an authentication disapproved notification. In the case that it is impossible to authenticate since the register image connected with the identification data does not exist in the authentication DB 330, the server side authentication processing unit 322 creates a notification to the effect that the image is not registered or a notification prompting the user to register. The server side authentication processing unit 322 may create a notification prompting the user to confirm that the moving image is being transmitted.

Thus, the authentication server 300 may determine correctly whether or not the user is him/herself by using the moving image of the user transmitted from the mobile terminal 100. Accordingly, the authentication server 300 has a very high level of security, and may prevent the mobile terminal 100 from being abused by a third party. Therefore, the authentication server 300 may prevent a third party from being authenticated as the user him/herself when the password is used, as in the conventional example, by a third party. Moreover, the communication control unit 310 receives the moving image transmitted from the mobile terminal 100. Therefore, the authentication server 300 may authenticate using the image irrespective of the location of the authentication subject. Accordingly, it is not necessary to provide cameras at each location where the authentication subject exists.

It should be noted that the authentication server 300 may include a display unit. In this case, the server side authentication processing unit 322 outputs the converted moving image to the display unit. The server side authentication processing unit 322 also outputs the register image acquired from the authentication DB 330 to the display unit. The operator of the authentication server 300 checks the moving image against the register image displayed upon the display unit. The operator inputs the results of the checks through the input unit 360. Next, the input unit 360 inputs the results of the checks inputted by the operator to the server side authentication processing unit 322. Alternatively, the operator may input questions to the user of the mobile terminal 100 through the input unit 360. The input unit 360 inputs the questions input by the operator to the server side authentication processing unit 322. The server side authentication processing unit 322 inputs the questions to the communication control unit 310. The communication control unit 310 transmits the questions to the mobile terminal 100. The server side authentication processing unit 322 may authenticate by using the responses to the questions received from the mobile terminal 100.

The server side registration processing unit 321 performs processing relating to the registration of the register image of the user. The server side registration processing unit 321 is a registration processing unit that registers the register image received by the communication control unit 310 in the authentication DB 330. The signal of the register image and the identification data of the user are inputted to the server side registration processing unit 321 by the communication control unit 310. The server side registration processing unit 321 converts the signal of the register image inputted from the communication control unit 310 into the register image. The server side registration processing unit 321 connects the identification data with the register image and stores them in the authentication DB 330. Thus, the server side registration processing unit 321 registers the register image of the user in the authentication DB 330.

The server side registration processing unit 321 acquires a static image from the moving image when the register image transmitted from the mobile terminal 100 is the moving image. Then the server side registration processing unit 321 stores the static image acquired from the moving image in the authentication DB 330 as the register image. The server side registration processing unit 321 may acquire a plurality of static images from the moving image and store them in the authentication DB 330. In addition, the server side registration processing unit 321 may store the moving image transmitted from the mobile terminal 100 as it is in the authentication DB 330.

At this time, the authentication server 300 may transmit a notification relating to the registration of the mobile terminal 100. In such a case, the server side registration processing unit 321 creates notification relating to the registration and inputs it to the communication control unit 310. For example, the server side registration processing unit 321 creates a registration complete notification when the registration of the register image is completed. The server side registration processing unit 321 may confirm the registration image before storing it in the authentication DB 330. At this time, if the register image is inappropriate, that is, if the register image is not clear, or if the register image is not received correctly, the server side registration processing unit 321 may not store the image in the authentication DB 330. Moreover, the server side registration processing unit 321 may create a notification prompting the user to retransmit the register image, or a notification rejecting the register image.

The server side registration processing unit 321 and server side authentication processing unit 322 operate independently. Therefore, the server side registration processing unit 321 and server side authentication processing unit 322 may be provided in different authentication servers. In addition, the authentication server 300 may be provided within the mobile communication network 200. In the authentication system 1, the authentication server 300 includes the communication control unit 310, the server side processing unit 320, the authentication DB 330, a starting condition storage unit 340, timer 350, and the input unit 360, however, these units may be provided separately, in a plurality of servers instead of a single server.

Figure 2:
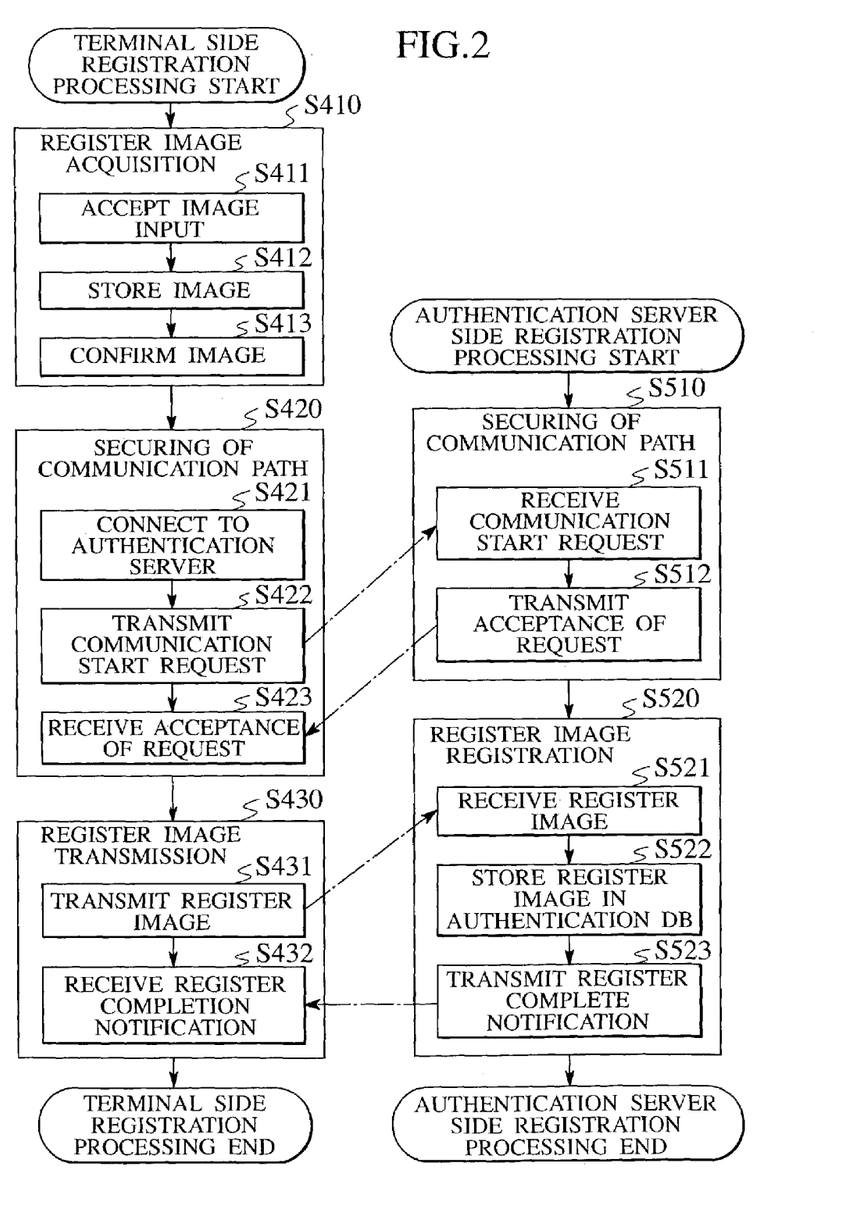
FIG. 2 is a flow diagram illustrating a registration processing procedure of a register image according to an embodiment of the present invention.

Next, processing between the mobile terminal 100 and the authentication server 300 is described. FIG. 2 illustrates the registration processing procedure of the register image by dividing the processing into a terminal side registration processing performed by the mobile terminal 100 and an authentication server side registration processing performed by the authentication server 300.

To begin with, the terminal side registration processing is described. The mobile terminal 100 acquires the register image (S410) More specifically, the image acquisition unit 130 acquires the register image, and the terminal side registration processing unit is 111 accepts the register image inputted from the image acquisition unit 130 (S411). For example, the image acquisition unit 130 acquires the image of the user, and inputs it to the terminal side registration processing unit 111. The display unit 170 displays the image of the user. The terminal side registration processing unit 111 outputs a message to the display unit 170 instructing the user to decide on the register image. The user then selects the register image with viewing the image displayed upon the display unit 170, and inputs it to the input unit 120. The terminal side registration processing unit 111 then acquires the static image or the moving image inputted from the image acquisition unit 130 in accordance with the user's operation inputted through the input unit 120.

The terminal side registration processing unit 111 stores the acquired register image in the memory unit 150 (S412). The terminal side registration processing unit 111 outputs the register image stored in the memory unit 150 together with instructions for the user to confirm the register image, to the display unit 170 (S413). The user may return to step S411 to acquisition the register image again, if the user wants to change the register image confirmed in the step (S413).

Next, the mobile terminal too secures the communication path with the authentication server 300, and connects (S420). More specifically, to begin with, the communication control unit 160 connects to the authentication server 300 (S421). The communication control unit 160 connects to the base station 201 via radio wave. Next, the communication control unit 160 connects to the authentication server 300 via the base station 201 and exchange 202. For example, the communication control unit 160 connects to the authentication server 300 through dial-up access.

Next, the communication control unit 160 transmits a communication start request to the authentication server 300 (S422). The communication control unit 160 receives the acceptance of the request transmitted from the authentication server 300. The acceptance of the request is a response to the effect that the communication start request is accepted (S423). If the communication control unit 160 can not receive the acceptance of the request, it may return to the step (S422) and retransmit the communication start request.

Next, the mobile terminal 100 transmits the register image (S430). More specifically, the terminal side authentication processing unit 111 converts the image, which is inputted from the image acquisition unit 130, into a signal that can be transmitted through the mobile communication network 200. The communication control unit 160 transmits the identification data of the user acquired from the memory unit 150 in addition to the register image signal converted by the terminal side registration processing unit 111 (S431). Finally, the communication control unit 160 receives the registration completion notification and terminates the registration processing (S432). The mobile terminal 100 may retransfer the register image when it can not receive the registration completion notification in step (S432).

Next, the authentication server side registration processing is described. To begin with, the authentication server 300 secures a communication path with the mobile terminal 100, and connects (S510). More specifically, the communication control unit 310 receives the communication start request transmitted from the mobile terminal 100 (S511). The communication control unit 310 secures the communication path with the mobile terminal 100 and connects, transmits the acceptance of the request to the mobile terminal 100 (S512). In step (S512), if the communication start request from the mobile terminal 100 is determined as being improper access, the communication control unit 310 may not transmit the acceptance of the request, and reject the communication start request.

Next, the authentication server 300 registers the register image transmitted from the mobile terminal 100 (S520). More specifically, the communication control unit 310 receives the register image and identification data transmitted from the mobile terminal 100 (S521). The server side registration processing unit 322 connects the register image received by the communication control unit 310 with the identification data and then stores them in the authentication DB 330 (S522). Finally, the authentication server 300 transmits the registration complete notification to the mobile terminal 100 and terminates registration processing of the register image (S523). In step (S522), the authentication server 300 may confirm the register image before stores it in the authentication DB 330. When the register image is inappropriate, the authentication server 300 may transmit a notification prompting retransmission of the register image or s notification rejecting an acceptance of the register image.

The order of step (S410) and step (S420) may be reversed. In steps (S420) and (S510), the mobile terminal 100 transmits the communication start request, however, the authentication server 300 may transmit the communication start request.

Figure 3:
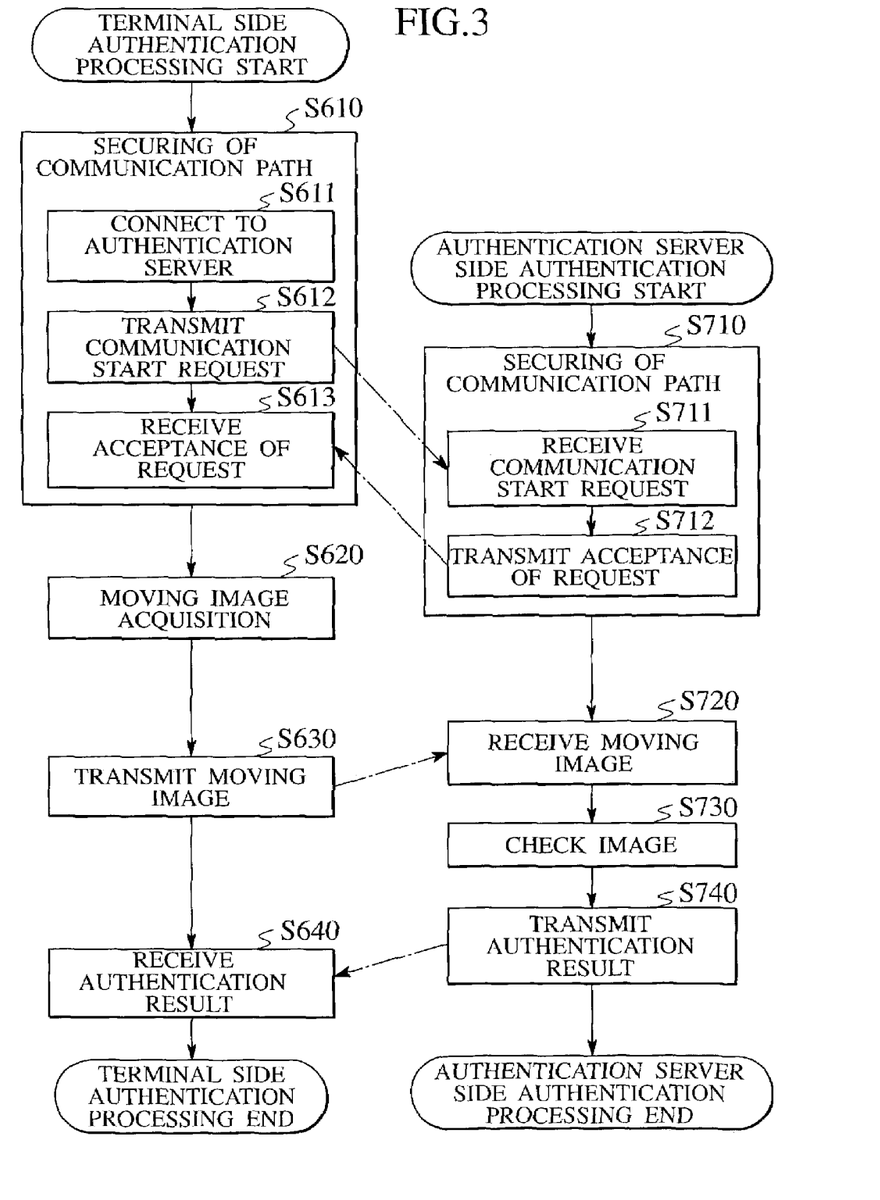
FIG. 3 is a flow diagram illustrating an authentication processing procedure according to an embodiment of the present invention.

Next, FIG. 3 illustrates the authentication processing procedure by dividing the processing into a terminal side authentication processing performed by the mobile terminal 100 and an authentication server side authentication processing performed by the authentication server 300. To begin with, the terminal side authentication processing is described. At first, the mobile terminal 100 secures the communication path with the authentication server 300, and connects (S610). More specifically, the mobile terminal 100 connects to the authentication server 300 (S611), transmits a communication start request (S612), and receives the acceptance of the request (S613). The steps (S611) through (S613) are substantially identical to the steps (S421) through (S423) shown in FIG. 2.

Next, the mobile terminal 100 acquires a moving image (S620). More specifically, the image acquisition unit 130 acquires the user's moving image of the user, and inputs it to the terminal side authentication processing unit 112. At this time, the display unit 170 displays the moving image of the user. The terminal side authentication processing unit 112 outputs a message instructing the user to confirm the moving image to the display unit 170. Then the user views and confirms the moving image displayed upon the display unit 170.

Next, the mobile terminal 100 transmits the moving image to the authentication server 300 (S630). More specifically, the terminal side authentication processing unit 112 converts the moving image inputted from the image acquisition unit 130, into a signal that can be transmitted through the mobile communication network 200. The communication control unit 160 then transmits to the authentication server 300 the identification data of the user acquired from the memory unit 150 in addition to the signal of the moving image converted by the terminal side authentication processing unit 112.

Step (S620) and step (S630) are always performed while the mobile terminal 100 and the authentication server 300 are connected. In other words, the mobile terminal 100 acquires the real-time moving image of the user, and continues to transmit it to the authentication server 300 in real time.

Then the mobile terminal 100 receives a notification of the authentication result from the authentication server 300 (S640). More specifically, the mobile terminal 100 receives the authentication complete notification when the user is identified as the user him/herself by the authentication server 300. And the mobile terminal 100 continues to connect with the authentication server 300 while the user is identified as him/herself by the authentication server 300. On the other hand, if the user is not identified as him/herself by the authentication server 300, the mobile terminal 100 receives an authentication disapproved notification. The mobile terminal 100 is disconnected by the authentication server 300. The mobile terminal 100 registers the register image upon receiving a notification to the effect that the register image is not registered or a notification prompting the user to register from the authentication server 300.

Next, the authentication server side authentication processing is described. To begin with, the authentication server 300 secures the communication path with the mobile terminal 100, and connects (S710). More specifically, the authentication server 300 receives a communication start request (S711), and transmits an acceptance of the request (S712). The steps (S711) and (S712) are substantially identical to steps (S511) and (S512) shown in FIG. 2.

Next, the authentication server 300 receives the moving image (S720). The communication control unit 310 continues to receive the real-time moving images and identification data of the user transmitted from the mobile terminal 100 while the authentication server 300 and the mobile terminal 100 are connected. Next, the authentication server 300 checks the moving image received by the communication control unit 310 against the register image stored in the authentication DB 330. The authentication server 300 also checks the identification data received by the communication control unit 310 against the identification data acquired from the authentication DB 330.

Then the authentication server 300 then transmits the notification of the authentication result to the mobile terminal 100 (S740). More specifically, when the user is identified as him/herself, the authentication server 300 transmits an authentication complete notification. And the authentication server 300 continues to connect with the mobile terminal 100 if the user is identified as him/herself. On the other hand, if the user is not identified as him/herself, the authentication server 300 transmits an authentication disapproved notification. And the authentication server 300 then disconnects from the mobile terminal 100. If authentication cannot be made because the register image connected with the identification data does not exist in the authentication DB 330, then the authentication server 300 transmits a notification to the effect that the register image is not registered or a notification prompting the user to register.

The order of steps (S610) and step (S620) may be reversed. In steps (S610) and (S710), the mobile terminal 100 transmits the communication start request, however, the communication start request may be transmitted by the authentication server 300.

Figure 4:
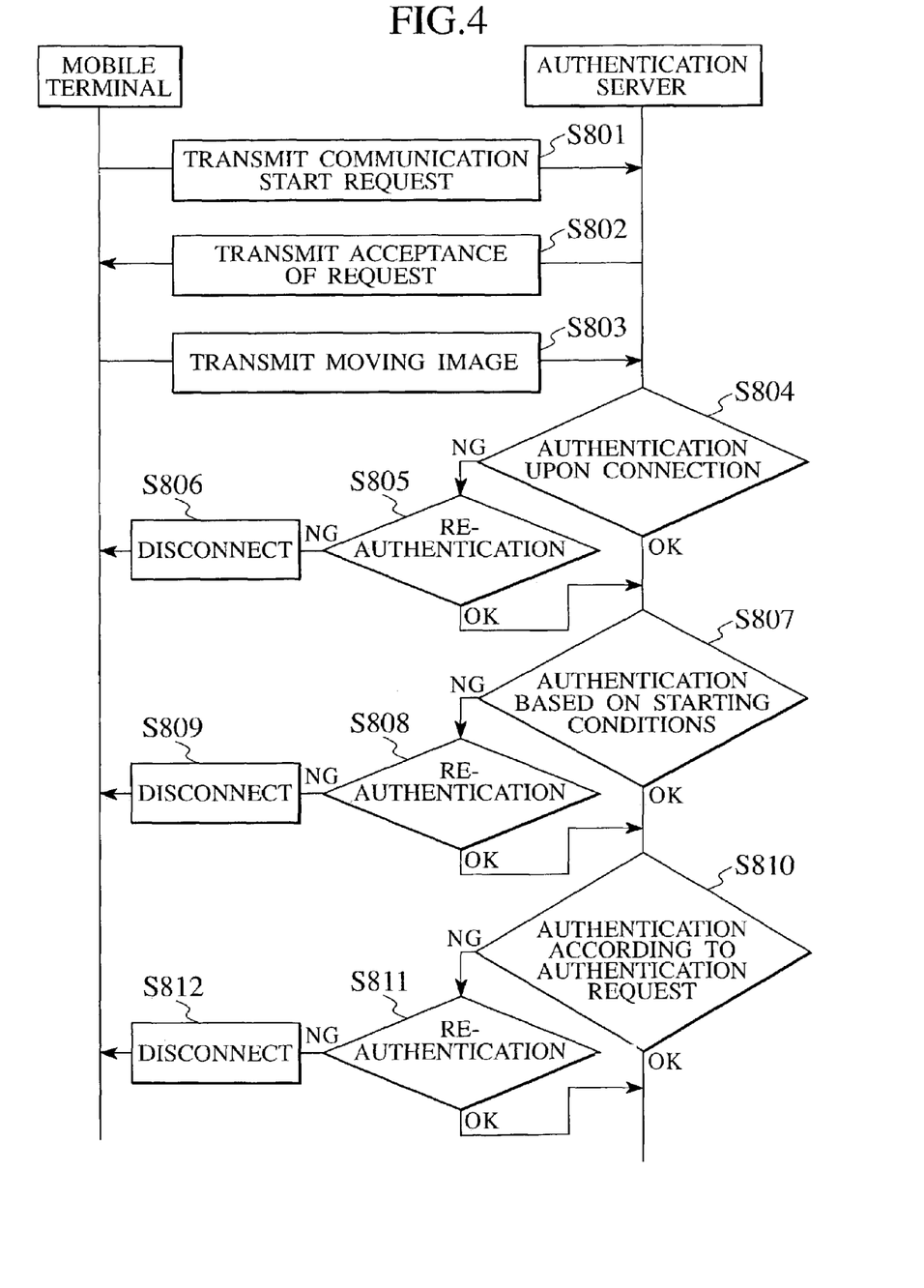
FIG. 4 is a sequential diagram describing the authentication processing according to an embodiment of the present invention.

Next, the authentication processing that is performed by the authentication server 300 while connected with the mobile terminal 100 is described with reference to FIG. 4. In FIG. 4, the case in which the mobile terminal 100 uses the service for selling goods provided by the server 211 is described as an example.

To begin with, the mobile terminal 100 transmits a communication start request to the authentication server 300 when using the service provided by the server 211 (S801). The authentication server 300 transmits the acceptance of the request in response to the communication start request from the mobile terminal 100 (S802). Through this, the mobile terminal 100 and the authentication server 300 are connected. The mobile terminal 100 starts the transmission of the moving image when the mobile terminal 100 and the authentication server 300 are connected (S803). Hereafter, the mobile terminal 100 continues to transmit the moving image while the mobile terminal 100 and the authentication server 300 are connected.

The authentication server 300 authenticates when the mobile terminal connects to the authentication server 300. The authentication server 300 authenticates using the real-time moving image of the user received when connected to the mobile terminal 100 (S804). In step (S804), if the user is identified as him/herself, then the authentication server 300 remains connected to the mobile terminal 100. On the other hand, in step (S804), if the user is not identified as him/herself, then the authentication server 300 performs the re-authentication. The authentication server 300 uses the real-time moving image of the user received when re-authentication is performed (S805). This is because the starting condition storage unit 340 stores the starting conditions for performing re-authentication when the checked results of the moving image against the register image and identification data do not identify the user as him/herself, and as a result, the server side authentication processing unit 322 starts re-authentication based on the starting conditions.

In step (S805), if the user is identified as him/herself, then the authentication server 300 remains connected to the mobile terminal 100. On the other hand, in step (S805), if the user is not identified as him/herself, the authentication server 300 disconnects from the mobile terminal 100 (S806).

The server 211 transmits the contents of the goods to only the mobile terminal 100 used by the user who has been identified as him/herself by the authentication server 300, thus begins the service. In the meantime, the mobile terminal 100 transmits the moving image of the user to the authentication server 300.

The starting condition storage unit 340 stores the cycle for starting authentication as the starting condition. Therefore, the server side authentication processing unit 322 acquires the cycle as the starting condition from the starting condition storage unit 340, and acquires time from the timer 350. The server side authentication processing unit 322 automatically starts authentication when the time reaches the cycle of the starting condition. The authentication server 300 performs authentication by using the real-time moving image of the user received when the timer reaches the cycle of the starting condition (S807).

In step (S807), if the user is identified as him/herself, then authentication server 300 remains connected to the mobile terminal 100. On the other hand, in step (S807), if the user is not identified as him/herself, then the authentication server 300 performs re-authentication (S808). In step (S808), if the user is identified as him/herself, then the authentication server 300 remains connected to the mobile terminal 100. On the other hand, in step (S808), If the user is not identified as him/herself, then the authentication server 300 disconnects from the mobile terminal 100 (S809).

Thereafter, the server 211 makes a request for the authentication of the user to the authentication server 300 when the user of the mobile terminal 100 purchases goods. The authentication server 300 accepts the authentication request from the server 211. Next, the authentication server 300 starts the authentication of the user. The authentication server 300 authenticates using the real-time moving image of the user received when the request from the server 211 is accepted (S810). The authentication server 300 may start authentication when the user attempts to purchase goods, by storing the starting condition that authentication starts when the user purchases goods as a starting condition storage unit 340. In addition. the authentication server 300 may start authentication when the user purchases goods by making the operator of the authentication server 300 input an authentication request through the input unit 360 when the user purchases goods.

In step (S810), if the user is identified as him/herself, then the authentication server 300 remains connected to the mobile terminal 100. On the other hand, in step (S810), if the user is not identified as him/herself, then the authentication server 300 performs re-authentication (S811). In step (S811), if the user is identified as him/herself, the authentication server 300 remains connected to the mobile terminal 100. On the other hand, in step (S811), if the user is not identified as the authorized user, the authentication server 300 disconnects the mobile terminal 100 (S812).

Thus, the authentication server 300 continues to receive the moving image of the user while connected to the mobile terminal 100. As a result, the authentication server 300 may authenticate at any time. Accordingly, the authentication server 300 may confirm whether the user is him/herself or not, not only in step (S804) when the mobile terminal 100 connects to the authentication server 300, but also in subsequent steps such as steps (S807) and (S810).

Therefore, even when the user is identified as him/herself upon connection, the authentication server 311 may prevent a third party from performing subsequent operations such as purchasing goods as a result of a third parry stealing the image during connection. The authentication server 300 may authenticate whenever authentication is desired such as when the user purchases goods. Accordingly, with the authentication server 300, it is possible to obtain effects similar to over-the-counter selling.

Furthermore, the mobile terminal 100 is always transmitting the moving image while connected to the authentication server 300. Therefore, it is not necessary for the mobile terminal 100 to perform any operation requested by the authentication server 300 during authentication or the re-authentication by the authentication server 300. It should be noted that in steps (S805), (S808), and (S811), the authentication server 300 performs re-authentication only once, however, it may be possible to perform re-authentication several times. The present invention is not limited to the above-described embodiment, and that various modifications are possible.

What is claimed is:

1. An authentication system comprising:
   a register image storage unit, which stores a pre-registered register image of a mobile terminal user;
   a communication control unit, which receives a moving image of the user transmitted from the mobile terminal;
   an authentication processing unit, which authenticates the user by checking the moving image received by the communication control unit against the register image stored in said register image storage unit; and
   a starting condition storage unit, which stores a starting condition, the starting condition being a cycle which starts authentication, the mobile terminal configured to be connected with the authentication processing unit during the duration of the cycle allowing the re-authentication attempt using the moving image when the user is not authenticated during an initial authentication attempt, wherein
   the moving image is received continuously by the communication control unit during the duration of the cycle, and
   the authentication processing unit authenticates based on the starting condition stored in the starting condition storage unit.

2. The authentication system of claim 1, wherein the communication control unit receives the moving image continuously while connected to the mobile terminal.

3. The authentication system of claim 1, wherein:
the register image storage unit connects and stores identification data for identifying the user with the register image;
the communication control unit receives the moving image and the identification data; and
the authentication processing unit authenticates by checking the moving image against the register image and the received identification data against the identification data stored in the register image storage unit.

4. The authentication system of claim 1, wherein the authentication processing unit accepts a request for authentication, and authenticates based on the accepted request.

5. The authentication system of claim 1, wherein the authentication processing unit acquires a static image from the moving image received by the communication control unit, and checks the acquired static image against the register image.

6. The system of claim 1, wherein
said starting condition being a timing cycle.

7. The system of claim 1, wherein
said starting condition being an indication of an occurrence of a predetermined event.

8. The authentication system of claim 1, further comprising a registration processing unit, which registers the register image received by the communication control unit in the register image storage unit, wherein
the communication control unit receives the register image transmitted from the mobile terminal.

9. The authentication system of claim 8, wherein:
the communication control unit receives the register image transmitted from the mobile terminal and identification data for identifying the user; and
the registration processing unit connects the identification data with the register image received by said communication control unit, and stores these in the register image storage unit.

10. An authentication system comprising:
a register image storage unit, which stores a pre-registered register image of a mobile terminal user;
a communication control unit, which receives a moving image of the user transmitted from the mobile terminal;
an authentication processing unit, which authenticates the user by checking the moving image received by the communication control unit against the register image stored in said register image storage unit, wherein, in the case that a checked result of the moving image against the register image does not identify the user as him/herself, the authentication processing unit performs re-authentication by using the moving image being transmitted continuously and received by the communication control unit and performing re-authentication, the mobile terminal maintaining a connection with the authentication processing unit during the initial check and the re-authentication process, when the user is not authenticated during the initial check, to continuously transmit the moving image.

11. An authentication method, comprising:
receiving, by an authentication system that authenticates a mobile terminal user, a moving image of the mobile terminal user transmitted from a terminal; and
checking the received moving image against a register image to authenticate the user by the authentication system, which stores the pre-registered register image of the user;
storing a starting condition for determining a cycle which starts authentication;
performing authentication when the starting condition is satisfied; and
maintaining a connection between the mobile terminal and the authentication system during the checking step so that a re-authentication can be performed when the user is not authenticated during the initial check, the moving image being continuously transmitted during the maintained connection.

12. The authentication method of claim 11, wherein the authentication system receives the moving image continuously while connected to the mobile terminal.

13. The authentication method of claim 11, wherein:
the authentication system connects and stores identification data for identifying the user with the register image;
the authentication system receives the moving image and the identification data; and
the authentication system authenticates by checking the moving image against the register image, and the received identification data against the stored identification data.

14. The authentication method of claim 11, wherein: the authentication system accepts a request for authentication; and
the authentication system authenticates based on the accepted request.

15. The authentication method of claim 11, wherein the authentication system acquires a static image from the received moving image, and checks the acquired static image against the register image.

16. The authentication method of claim 11, wherein:
the authentication system receives the register image transmitted from the mobile terminal; and
the authentication system stores the received register image in the authentication system.

17. The method of claim 11, wherein
said starting cycle being a timing cycle.

18. The method of claim 11, wherein said starting condition being an indication of an occurrence of a predetermined event.

19. An authentication method, comprising:
receiving, by an authentication system that authenticates a mobile terminal user, a moving image of the mobile terminal user transmitted from a terminal;
checking the received moving image against a register image to authenticate the user by the authentication system, which stores the pre-registered register image of the user, wherein the authentication system performs re-authentication by using the received moving image which is transmitted continuously when re-authentication is performed, in a case where a checked result of the moving image against the register image does not identify the user as him/herself, the mobile terminal maintaining a connection with the authentication processing unit during the initial check and the re-authentication process, when the user is not authenticated during the initial check, to continuously transmit the moving image.

* * * * *